United States Patent
Werblin et al.

(10) Patent No.: US 11,475,547 B2
(45) Date of Patent: Oct. 18, 2022

(54) METHODS AND APPARATUS FOR CONTRAST SENSITIVITY COMPENSATION

(71) Applicant: Irisvision, Inc., Pleasanton, CA (US)

(72) Inventors: Frank Werblin, Berkeley, CA (US); Robert Massof, Pasadena, MD (US); Chris Bradley, Baltimore, MD (US)

( * ) Notice: Subject to any disclaimer, the term of this patent is extended or adjusted under 35 U.S.C. 154(b) by 163 days.

(21) Appl. No.: 17/084,233

(22) Filed: Oct. 29, 2020

(65) Prior Publication Data

US 2021/0118106 A1    Apr. 22, 2021

Related U.S. Application Data

(63) Continuation of application No. 16/274,976, filed on Feb. 13, 2019, now Pat. No. 10,963,999.

(60) Provisional application No. 62/629,774, filed on Feb. 13, 2018.

(51) Int. Cl.
    *G06T 5/00*     (2006.01)
    *G06T 7/90*     (2017.01)

(52) U.S. Cl.
    CPC .............. *G06T 5/009* (2013.01); *G06T 7/90* (2017.01); *G06T 2200/24* (2013.01); *G06T 2207/10016* (2013.01); *G06T 2207/20172* (2013.01)

(58) Field of Classification Search
    CPC . G06T 2207/20172; G06T 2207/10016; G06T 2200/24; G06T 7/90; G06T 5/009
    See application file for complete search history.

(56) References Cited

U.S. PATENT DOCUMENTS

| | | |
|---|---|---|
| 4,461,551 A | 7/1984 | Blaha |
| 4,586,892 A | 5/1986 | Ichizawa |
| 4,634,243 A | 1/1987 | Massof |
| 4,751,507 A | 6/1988 | Hama |
| 4,848,898 A | 7/1989 | Massof |
| 4,856,892 A | 8/1989 | Ben-Tovim |
| 5,151,722 A | 9/1992 | Massof |
| 5,359,675 A | 10/1994 | Siwoff |
| 5,717,834 A | 2/1998 | Werblin |
| 5,719,593 A | 2/1998 | De Lange |
| 5,808,589 A | 9/1998 | Fergason |

(Continued)

FOREIGN PATENT DOCUMENTS

| | | |
|---|---|---|
| CN | 103110401 A | 5/2013 |
| CN | 104688179 A | 6/2015 |

(Continued)

OTHER PUBLICATIONS

Birkfellner, W. "Computer-enhanced stereoscopic vision in a head-mounted operating binocular" Physics in Medicine & Biology, vol. 48, No. 3, Jan. 22, 2003.*

(Continued)

*Primary Examiner* — Mia M Thomas
(74) *Attorney, Agent, or Firm* — Novel IP

(57) ABSTRACT

A system and methods for contrast sensitivity compensation provides for correcting the vision of users whose vision is deficient for discerning high spatial frequencies. The system and methods use measurements of the user's contrast detection as a function of spatial frequency in the image to correct images in real time. The system includes a head-mountable device that includes a camera and a processor that can provide enhanced images at video framing rates.

21 Claims, 12 Drawing Sheets

(56) References Cited

U.S. PATENT DOCUMENTS

| | | |
|---|---|---|
| 5,933,082 A | 8/1999 | Abita |
| 6,061,064 A | 5/2000 | Reichlen |
| 6,067,112 A | 5/2000 | Wellner |
| 6,529,331 B2 | 3/2003 | Massof |
| 6,545,685 B1 | 4/2003 | Dorbie |
| 6,590,583 B2 | 7/2003 | Soohoo |
| 6,591,008 B1 | 7/2003 | Surve |
| 6,704,034 B1 | 3/2004 | Rodriguez |
| 6,766,041 B2 | 7/2004 | Golden |
| 6,889,006 B2 | 5/2005 | Kobayashi |
| 7,486,302 B2 | 2/2009 | Shoemaker |
| 7,522,344 B1 | 4/2009 | Curatu |
| 7,542,210 B2 | 6/2009 | Chirieleison, Sr. |
| 7,612,804 B1 | 11/2009 | Marcu |
| 7,806,528 B2 | 10/2010 | Bedell |
| 7,883,210 B2 | 2/2011 | Filar |
| 8,103,352 B2 | 1/2012 | Fried |
| 8,239,031 B2 | 8/2012 | Fried |
| 8,253,787 B2 | 8/2012 | Yamamoto |
| 8,311,328 B2 | 11/2012 | Spruck |
| 8,350,898 B2 | 1/2013 | Chang |
| 8,454,166 B2 | 6/2013 | Fateh |
| 8,490,194 B2 | 7/2013 | Moskovitch |
| 8,511,820 B2 | 8/2013 | Trachtman |
| 8,516,584 B2 | 8/2013 | Moskovitch |
| 8,571,670 B2 | 10/2013 | Fried |
| 8,725,210 B2 | 5/2014 | Yang |
| 8,760,569 B2 | 6/2014 | Yang |
| 8,798,453 B2 | 8/2014 | Lawton |
| 8,836,778 B2 | 9/2014 | Ignatovich |
| 8,862,183 B2 | 10/2014 | Kulas |
| D717,856 S | 11/2014 | Slawson |
| 8,879,813 B1 | 11/2014 | Solanki |
| 8,888,288 B2 | 11/2014 | Iravani |
| 8,905,543 B2 | 12/2014 | Davis |
| 8,922,366 B1 | 12/2014 | Honoré |
| 8,976,247 B1 | 3/2015 | Karner |
| 9,019,420 B2 | 4/2015 | Hurst |
| 9,031,610 B2 | 5/2015 | Kulas |
| 9,066,683 B2 | 6/2015 | Zhou |
| 9,149,179 B2 | 10/2015 | Barnard |
| 9,213,185 B1 | 12/2015 | Starner |
| 9,215,977 B2 | 12/2015 | Kohn Bitran |
| 9,545,422 B2 | 1/2017 | Greenberg |
| 9,607,652 B2 * | 3/2017 | Bose ............... H04N 5/77 |
| 9,706,918 B2 | 7/2017 | Myung |
| 9,891,435 B2 | 2/2018 | Boger |
| 10,092,182 B2 | 10/2018 | Myung |
| 10,146,304 B2 * | 12/2018 | Werblin ............ G02B 27/017 |
| 10,188,294 B2 | 1/2019 | Myung |
| D848,420 S | 5/2019 | Boger |
| 10,345,591 B2 | 7/2019 | Samec |
| D863,300 S | 10/2019 | Boger |
| 10,444,833 B2 | 10/2019 | Werblin |
| 10,488,659 B2 | 11/2019 | Boger |
| 10,613,323 B1 | 4/2020 | Wheelwright |
| 10,743,761 B2 | 8/2020 | Myung |
| 11,144,119 B2 * | 10/2021 | Werblin ............ G02B 27/0172 |
| 2002/0101568 A1 | 8/2002 | Eberl |
| 2002/0181115 A1 | 12/2002 | Massof |
| 2003/0182394 A1 | 9/2003 | Ryngler |
| 2004/0136570 A1 | 7/2004 | Ullman |
| 2004/0208343 A1 | 10/2004 | Golden |
| 2005/0162512 A1 | 7/2005 | Seakins |
| 2005/0200707 A1 | 9/2005 | Yogesan |
| 2005/0237485 A1 | 10/2005 | Blum |
| 2005/0270484 A1 | 12/2005 | Maeda |
| 2006/0129207 A1 | 6/2006 | Fried |
| 2006/0167530 A1 | 7/2006 | Flaherty |
| 2006/0282129 A1 | 12/2006 | Fried |
| 2006/0290712 A1 | 12/2006 | Hong |
| 2007/0106143 A1 | 5/2007 | Flaherty |
| 2007/0198941 A1 | 8/2007 | Baar |
| 2007/0235648 A1 | 10/2007 | Teich |
| 2007/0280677 A1 | 12/2007 | Drake |
| 2007/0294768 A1 | 12/2007 | Moskovitch |
| 2008/0106489 A1 | 5/2008 | Brown |
| 2008/0184371 A1 | 7/2008 | Moskovitch |
| 2008/0238947 A1 | 10/2008 | Keahey |
| 2008/0247620 A1 | 10/2008 | Lewis |
| 2008/0278821 A1 | 11/2008 | Rieger |
| 2009/0059364 A1 | 3/2009 | Brown |
| 2009/0062686 A1 | 3/2009 | Hyde |
| 2009/0322859 A1 | 12/2009 | Shelton |
| 2010/0016730 A1 | 1/2010 | Tanaka |
| 2010/0079356 A1 | 4/2010 | Hoellwarth |
| 2010/0283800 A1 | 11/2010 | Cragun |
| 2010/0289632 A1 * | 11/2010 | Seder .................. G06V 10/95 382/104 |
| 2010/0328420 A1 | 12/2010 | Roman |
| 2011/0085138 A1 | 4/2011 | Filar |
| 2011/0102579 A1 | 5/2011 | Sung |
| 2011/0221656 A1 | 9/2011 | Haddick |
| 2011/0224145 A1 | 9/2011 | Greenberg |
| 2011/0241976 A1 | 10/2011 | Boger |
| 2011/0299036 A1 | 12/2011 | Goldenholz |
| 2012/0062840 A1 | 3/2012 | Ballou, Jr. |
| 2012/0176689 A1 | 7/2012 | Brown |
| 2012/0194550 A1 | 8/2012 | Osterhout |
| 2012/0212594 A1 | 8/2012 | Barnes |
| 2012/0229617 A1 | 9/2012 | Yates |
| 2012/0242678 A1 | 9/2012 | Border |
| 2012/0249797 A1 | 10/2012 | Haddick |
| 2012/0262558 A1 | 10/2012 | Boger |
| 2012/0277826 A1 | 11/2012 | Fried |
| 2012/0316776 A1 | 12/2012 | Brown |
| 2012/0320340 A1 | 12/2012 | Coleman, III |
| 2013/0050273 A1 | 2/2013 | Fujimura |
| 2013/0083185 A1 | 4/2013 | Coleman, III |
| 2013/0110236 A1 | 5/2013 | Nirenberg |
| 2013/0127980 A1 | 5/2013 | Haddick |
| 2013/0128364 A1 | 5/2013 | Wheeler |
| 2013/0150123 A1 | 6/2013 | Kulas |
| 2013/0242262 A1 | 9/2013 | Lewis |
| 2013/0293840 A1 | 11/2013 | Bartels |
| 2013/0300919 A1 | 11/2013 | Fletcher |
| 2013/0329190 A1 | 12/2013 | Lewis |
| 2014/0002792 A1 | 1/2014 | Filar |
| 2014/0071547 A1 | 3/2014 | O'Neill |
| 2014/0078594 A1 | 3/2014 | Springer |
| 2014/0085603 A1 | 3/2014 | Su |
| 2014/0098120 A1 | 4/2014 | Ritts |
| 2014/0114208 A1 | 4/2014 | Smith |
| 2014/0132932 A1 | 5/2014 | Jung |
| 2014/0192022 A1 | 7/2014 | Yamamoto |
| 2014/0218193 A1 | 8/2014 | Huston |
| 2014/0228668 A1 | 8/2014 | Wakizaka |
| 2014/0268053 A1 | 9/2014 | Fabian |
| 2014/0327753 A1 | 11/2014 | Prabhakar |
| 2014/0327754 A1 | 11/2014 | Prabhakar |
| 2014/0327755 A1 | 11/2014 | Prabhakar |
| 2014/0350379 A1 | 11/2014 | Verdooner |
| 2015/0002950 A1 | 1/2015 | O'Neill |
| 2015/0042873 A1 | 2/2015 | Hunt |
| 2015/0045012 A1 | 2/2015 | Siminou |
| 2015/0077565 A1 | 3/2015 | Karner |
| 2015/0098060 A1 | 4/2015 | Zhou |
| 2015/0103317 A1 | 4/2015 | Goldfain |
| 2015/0104087 A1 | 4/2015 | Katuwal |
| 2015/0138048 A1 | 5/2015 | Park |
| 2015/0169531 A1 | 6/2015 | Campbell |
| 2015/0223678 A1 | 8/2015 | Goldfain |
| 2015/0223686 A1 | 8/2015 | Wang |
| 2015/0234189 A1 | 8/2015 | Lyons |
| 2015/0254524 A1 | 9/2015 | Dickrell, III |
| 2015/0257639 A1 | 9/2015 | Manquez Hatta |
| 2015/0313462 A1 | 11/2015 | Reis |
| 2015/0320313 A1 | 11/2015 | Stamile |
| 2015/0339589 A1 | 11/2015 | Fisher |
| 2015/0346348 A1 | 12/2015 | Liu |
| 2015/0348327 A1 | 12/2015 | Zalewski |
| 2016/0015264 A1 | 1/2016 | Pankajakshan |
| 2016/0045388 A1 | 2/2016 | Krenik |
| 2016/0048203 A1 | 2/2016 | Blum |

(56) References Cited

U.S. PATENT DOCUMENTS

| | | |
|---|---|---|
| 2016/0051142 A1 | 2/2016 | Howes |
| 2016/0063893 A1 | 3/2016 | Kanuganti |
| 2016/0097930 A1 | 4/2016 | Robbins |
| 2016/0104453 A1 | 4/2016 | Borenstein |
| 2016/0113489 A1 | 4/2016 | Myung |
| 2016/0156850 A1 | 6/2016 | Werblin |
| 2016/0173752 A1 | 6/2016 | Caviedes |
| 2016/0199649 A1* | 7/2016 | Barnes .................. G06T 7/162 382/128 |
| 2016/0264051 A1 | 9/2016 | Werblin |
| 2016/0314564 A1 | 10/2016 | Jones |
| 2016/0379593 A1 | 12/2016 | Borenstein |
| 2017/0172675 A1 | 6/2017 | Jarc |
| 2017/0200296 A1 | 7/2017 | Jones |
| 2017/0236332 A1 | 8/2017 | Kipman |
| 2017/0280996 A1 | 10/2017 | Myung |
| 2018/0017820 A1 | 1/2018 | Cheng |
| 2018/0116509 A1 | 5/2018 | Myung |
| 2018/0125716 A1 | 5/2018 | Cho |
| 2018/0144554 A1 | 5/2018 | Watola |
| 2018/0239137 A1 | 8/2018 | Boger |
| 2018/0239425 A1 | 8/2018 | Jang |
| 2019/0026958 A1* | 1/2019 | Gausebeck .......... H04N 13/246 |
| 2019/0056783 A1 | 2/2019 | Werblin |
| 2019/0094552 A1 | 3/2019 | Shousha |
| 2019/0180421 A1 | 6/2019 | Kim |
| 2019/0208186 A1 | 7/2019 | Kawabe |
| 2019/0222817 A1 | 7/2019 | Abou Shousha |
| 2019/0251672 A1 | 8/2019 | Lim |
| 2019/0251679 A1* | 8/2019 | Werblin ................ G06T 5/009 |
| 2019/0302886 A1 | 10/2019 | Werblin |
| 2020/0008673 A1 | 1/2020 | Myung |
| 2020/0097019 A1* | 3/2020 | Yu ........................ G06V 10/141 |
| 2020/0112691 A1 | 4/2020 | Werblin |
| 2020/0151859 A1* | 5/2020 | Long, II .................. G06T 5/40 |
| 2020/0311887 A1* | 10/2020 | Kar ........................ G06T 5/50 |
| 2021/0153741 A1 | 5/2021 | Berdahl |
| 2021/0271318 A1* | 9/2021 | Bradley ............... A61B 3/0058 |
| 2021/0290056 A1 | 9/2021 | Karandikar |
| 2021/0373656 A1 | 12/2021 | Watola |
| 2022/0043513 A1* | 2/2022 | Werblin ................ G06F 3/013 |
| 2022/0171456 A1* | 6/2022 | Siddiqi ................. G06F 3/013 |

FOREIGN PATENT DOCUMENTS

| | | | |
|---|---|---|---|
| CN | 113019973 A | * | 6/2021 |
| EP | 2621169 A1 | | 7/2013 |
| JP | 2004279733 A | | 10/2004 |
| JP | 2005524462 A | | 8/2005 |
| JP | 2006212102 A | | 8/2006 |
| JP | 2007178409 | | 7/2007 |
| JP | 2007520243 A | | 7/2007 |
| JP | 2008093118 A | | 4/2008 |
| JP | 2008295725 A | | 12/2008 |
| JP | 2009031685 | | 2/2009 |
| JP | 2013104986 A | | 5/2013 |
| JP | 2013125038 | | 6/2013 |
| WO | 1992008157 A1 | | 5/1992 |
| WO | 1995006288 A2 | | 3/1995 |
| WO | 1998044468 A1 | | 10/1998 |
| WO | 2002086590 A1 | | 10/2002 |
| WO | 2002099597 A2 | | 12/2002 |
| WO | 03043363 A1 | | 5/2003 |
| WO | 2007069294 A1 | | 6/2007 |
| WO | 2008055262 A2 | | 5/2008 |
| WO | 2011159757 A2 | | 12/2011 |
| WO | 2012142202 A1 | | 10/2012 |
| WO | 2012176960 A1 | | 12/2012 |
| WO | 2014181096 A1 | | 11/2014 |
| WO | 2014194182 A1 | | 12/2014 |
| WO | 2015035229 A2 | | 3/2015 |
| WO | 2015054672 A1 | | 4/2015 |
| WO | 2015071779 A1 | | 5/2015 |
| WO | 2016077343 A1 | | 5/2016 |
| WO | 2016144419 A1 | | 9/2016 |
| WO | WO 2016/144419 A1 | * | 9/2016 ............. G02B 23/18 |
| WO | 2016205709 A1 | | 12/2016 |
| WO | 2018053509 A1 | | 3/2018 |
| WO | 2019094047 A1 | | 5/2019 |
| WO | 2019160962 A1 | | 8/2019 |

OTHER PUBLICATIONS

Victorson, E. "A Head Mounted Digital Image Warping Prosthesis for Age-Related Macular Degeneration" Univ. of Minnesota, May 2014, pp. 1-170.*

Web Search History for U.S. Appl. No. 16/447,481, filed Sep. 10, 2020.

Chen-Yung Hsu and Mark M. Uslan; When is a Little Magnification Enough? A Review of Microsoft Magnifier, AccessWorld Magazine, Jul. 2000, vol. 1, No. 4.

Richard D. Juday and David S. Loshin; Some Examples of Image Warping for Low Vision Prosthesis; Speidigitallibrary.org, Aug. 22, 1988.

Google Search of How to Install and Use Microsoft Magnifier, Mar. 29, 2018.

Gergely Vass and Tama Perlaki; Applying and removing lens distortion in post production, Colorfront Ltd., Budapest, 2003.

Eric Kenneth Victorson; A Head Mounted Digital Image Warping Prosthesis for Age-Related Macular Degeneration; U of Minn., May 2014.

International Search Report for PCT/US20/40726, dated Sep. 14, 2020.

Written Opinion of the International Searching Authority for PCT/US20/40726, dated Sep. 14, 2020.

International Search Report for PCT/US15/59950, dated Apr. 11, 2016.

Written Opinion of the International Searching Authority for PCT/US15/59950, dated Apr. 11, 2016.

International Search Report for PCT/US16/12135, dated Apr. 29, 2016.

Written Opinion of the International Searching Authority for PCT/US16/12135, dated Apr. 29, 2016.

International Search Report for PCT/US19/17860, dated May 14, 2019.

Written Opinion of the International Searching Authority for PCT/US19/17860, dated May 14, 2019.

Sample et al.; "Imaging and Perimtery Society Standards and Guidelines" Optometry and Vision Science, vol. 88, No. 1, Jan. 2011, pp. 4-7.

International Search Report for PCT/US21/22491, dated Aug. 12, 2021.

Written Opinion of the International Searching Authority for PCT/US21/22491, dated Aug. 12, 2021.

Stelmack, et al. "Is there a standard of care for eccentric viewing training?" Journal of Rehabilitation Research & Development; vol. 41, No. 5, pp. 729-738; Sep./Oct. 2004.

Hassan, et al. "Changes in the Properties of the Preferred Retinal Locus with Eccentric Viewing Training", Optom Vis Sci 2019;96:79-86. doi: 10.1097/OPX.0000000000001324.

International Search Report for PCT/US16/38176, dated Sep. 7, 2016.

GITHUB; RNCryptor/RNCryptor; 7 pages; retrieved from the internet (https://github.com/RNCryptor/RNCryptor).

Haddock et al.; Simple, inexpensive technique for high-quality smartphone fundus photography in human and animal eyes; Journal of Opththalmology; 2013; pp. 1-5; published online Sep. 19, 2013.

Hester et al.; Smart Phoneography—how to take slit lamp photographs with an iphone; 12 pages; retrieved from internet (http://eyewiki.aao.org/Smart_Phoneography_-_How_to_take_slit_lamp_photographs_with_an_iPhone).

Kim et al.; Smartphone photography safety; Ophthalmology; 119(10); pp. 220-2201; Oct. 2012.

Lord et al.; Novel uses of smartphones in ophthalmology; Ophthalmology; 117(6); pp. 1274-1274 e3; Jun. 2010.

(56) References Cited

OTHER PUBLICATIONS

Teichman et al.; From iphone to eyephone: a technique for photodocumentation; Can. J. Ophthalmol.; 46(3); pp. 284-286; Jun. 2011.
Wikipedia: Soap note; 6 pages; retreived from the interet (http://en.wikipedia.org/wiki/SOAP_note).
Apple Developer; Apple app store connect user guide; 4 pages; retrieved from the internet (https://developer.apple.com/support/ap-store-connect/).
Bastawrous; Smartphone fundoscopy; Ophthalmology; 119(2); pp. 432-433. e2; Feb. 2012.
Chakrabarti; Application of mobile technology in ophthalmology to meet the demands of low-resource settings; Journal of Mobile Technology in Medicine; 1(4S); pp. 1-3; Dec. 2012.
Chhablani et al.; Smartphones in ophthalmology; Indian J. Ophthalmol.; 60(2); pp. 127-131; Mar./Apr. 2012 (Author Manuscript).
Echanique et al.; Ocular Cellscope; University of California at Berkeley; Electrical engineering and computer sciences; 23 pages; retrieved from the internet (http://digitalassets.lib.berkeley.edu/techreports/ucb/text/EECS-2014-91 .pdf); May 16, 2014.
GITHUB; Nicklockwood/iCarousel; A simple, highly customisable, data-driven 3D carousel for iOS and Mac OS; 30 pages; retrieved from teh internet (https://github.com/nicklockwood/iCarousel).
GITHUB; Project—imas / encrypted-core-data; 6 pages; retrieved from the internet (https://github.com/project-imas/encrypted-core-data).

\* cited by examiner

METHODS AND APPARATUS FOR CONTRAST SENSITIVITY COMPENSATION

CROSS-REFERENCE TO RELATED APPLICATIONS

This application claims the benefit of U.S. Provisional Application No. 62/629,774, filed Feb. 13, 2018, the contents of which are hereby incorporated by reference in its entirety.

BACKGROUND OF THE INVENTION

Field of the Invention

The present invention generally relates to methods and apparatus to assist users with compromised vision, and more specifically to methods and apparatus for presenting images that are enhanced to compensate for regions of spatial frequency contrast loss.

Discussion of the Background

One characteristic of the visual system is the ability to discern contrast in an image—that is to recognize variations between light and dark, or between different colors, in a region of the visual field. The visual systems of some individuals are impaired relative to those having "normal" vision in that they have problems discerning objects of a certain size, such as small objects. Another way of considering this impairment is that the visual system has decreased contrast sensitivity for objects having high spatial frequencies in the image.

Thus, for example, patients with macular degeneration lose foveal vision accompanied by a loss of contrast sensitivity at high spatial frequencies.

Currently there are no approved treatments to correct or compensate for a loss of contrast sensitivity, and there are no approved treatments to correct or compensate for a loss of contrast sensitivity that is tailored to the spatial frequency range discernable by a user. There is a need in the art for a method and apparatus that can compensate for a loss of contrast sensitivity.

BRIEF SUMMARY OF THE INVENTION

It is one aspect to provide an apparatus or method to re-establish some, or all, of a user's ability to detect contrast in an image.

It is another aspect to provide an apparatus or method that enhances images based on the discernable spatial frequencies of a user.

It is one aspect to provide a method of providing enhanced video images to a user using a programmable electronic device. The method includes: obtaining input video images comprising a plurality of input images A; computing, in the programmable electronic device, the application of a contrast enhancement function (CEF) to the plurality of input images A to form a plurality of contrast enhanced images comprising contrast enhanced video images C where the contrast enhancement function is user-specific, and where the contrast enhancement function is frequency-dependent; and presenting, on a display of the programmable electronic device and to the user, the contrast enhanced video images C. The method is such that the contrast enhanced video images are preferentially enhanced at spatial frequencies discernable to the user.

It is another aspect to provide a method of providing enhanced images to a user using a programmable electronic device. The method includes: obtaining input video images comprising a plurality of input images A where each image of the plurality of input images includes a luminance image $Y(x, y)$ and chrominance images $C_B(x,y)$, $C_R(x, y)$, forming a contrast enhancement function $CEF_p(u)$, as $$CEF_p(u) = \begin{cases} \dfrac{CSF_n\left(\dfrac{u \times c_n}{c_p}\right)}{CSF_p(u)} & \text{for } u \leq c_p, \\ 1 & \text{for } u > c_p \end{cases}$$

where $CSF_p(u)$ is a contrast sensitivity function for the user p corresponding to minimum discernable contrasts to the user as a function spatial frequency u where c, is a spatial frequency cut-off for the user, which is the maximum spatial frequency at which the user can discern contrast; where $CSF_n(u)$ is a contrast sensitivity function for persons, n, having normal contrast sensitivity and where $c_n$ is a spatial cut-off frequency for persons, n, which is the maximum spatial frequency at which the user can discern contrast. The method further includes computing, in the programmable electronic device, the application of the contrast enhancement function to the plurality of input images A to form a plurality of contrast enhanced images comprising contrast enhanced video images C where the application includes performing a Fourier transform on the luminance image $Y(x,y)$ to obtain a luminance amplitude $A_Y(u)$ and phase $P_Y(u)$, enhancing the luminance amplitude by $A'_Y(u)=A_Y(u) \times CEF_p(u)$ performing an inverse Fourier transform on $A'_Y(u)$ and $P_Y(u)$ to obtain an enhanced luminance image $Y'(x, y)$, and combining the enhanced luminance image with unaltered chrominance images to form contrast enhanced video images $C(x, y)=[Y'(x, y), C_B(x, y), C_R(x, y)]$; and presenting, on a display of the programmable electronic device and to the user, the contrast enhanced video images $C(x,y)$. The method is such that the contrast enhanced video images are preferentially enhanced at spatial frequencies discernable to the user.

It is yet another aspect to provide a contrast sensitivity compensation system wearable by a user. The system includes: a memory including a stored program; a camera mounted on the user aimed to view the scene in front of the user and operable to obtain input video images of the scene comprising a plurality of input images A; a processor programmed to execute the stored program to compute the application of a contrast enhancement function to the plurality of input images A to form a plurality of contrast enhanced images comprising contrast enhanced video images C where the contrast enhancement function is user-specific, and where the contrast enhancement function is frequency-dependent; and present, to the user on a display of the programmable electronic device, the contrast enhanced video images C.

It is another aspect to provide a contrast sensitivity compensation system wearable by a user. The system includes: a memory including a stored program; a camera mounted on the user aimed to view the scene in front of the user and operable to obtain input video images of the scene comprising a plurality of input images A, where each image of the plurality of input images includes a luminance image $Y(x, y)$ and chrominance images $C_H(x,y)$, $C_R(x, y)$; a processor programmed to execute the stored program to compute the application of a contrast enhancement function to the plurality of input images A to form a plurality of contrast enhanced images comprising contrast enhanced video images C where the contrast enhancement function is user-specific and is $$CEF_p(u) = \begin{cases} \dfrac{CSF_n\left(\dfrac{u \times c_n}{c_p}\right)}{CSF_p(u)} & \text{for } u \le c_p, \\ 1 & \text{for } u > c_p \end{cases}$$

where $CSF_P(u)$ is a contrast sensitivity function, for the user p corresponding to minimum discernable contrasts to the user as a function spatial frequency u where $C_P$ is a spatial frequency cut-off for the user, which is the maximum spatial frequency at which the user can discern contrast, where $CSF_n(u)$ is a contrast sensitivity function for persons n having normal contrast sensitivity, where $c_n$ is a spatial cut-off frequency for persons n, which is the maximum spatial frequency at which the user can discern contrast, and where the processor is further programmed to execute the stored program to perform a Fourier transform on the luminance image Y(x,y) to obtain a luminance amplitude $A_Y(u)$ and phase $P_Y(u)$, enhance the luminance amplitude by $A'_Y(u)=A_Y(u) \times CEF_P(u)$, perform an inverse Fourier transform on $A'_Y(u)$ and $P_Y(u)$ to obtain an enhanced luminance image Y'(x, y), and the enhanced luminance image is combined with unaltered chrominance images to form contrast enhanced video images $C(x, y)=[Y'(x, y), C_B(x, y), C_R(x, y)]$; and present, to the user on a display of the programmable electronic device, the contrast enhanced video images C.

These features, together with the various ancillary provisions and features which will become apparent to those skilled in the art from the following detailed description, are attained by the method and apparatus of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

Certain embodiments of the present invention are directed to an apparatus to provide images that enhance the vision of users having a loss of contrast sensitivity of high spatial frequencies. The apparatus presents modified images that enhance the contrast, specifically for high spatial frequencies, to correct for deficiencies in a user's visual system. Certain other embodiments enhance images within the discernable spatial frequency range of the user.

Figure 1A:
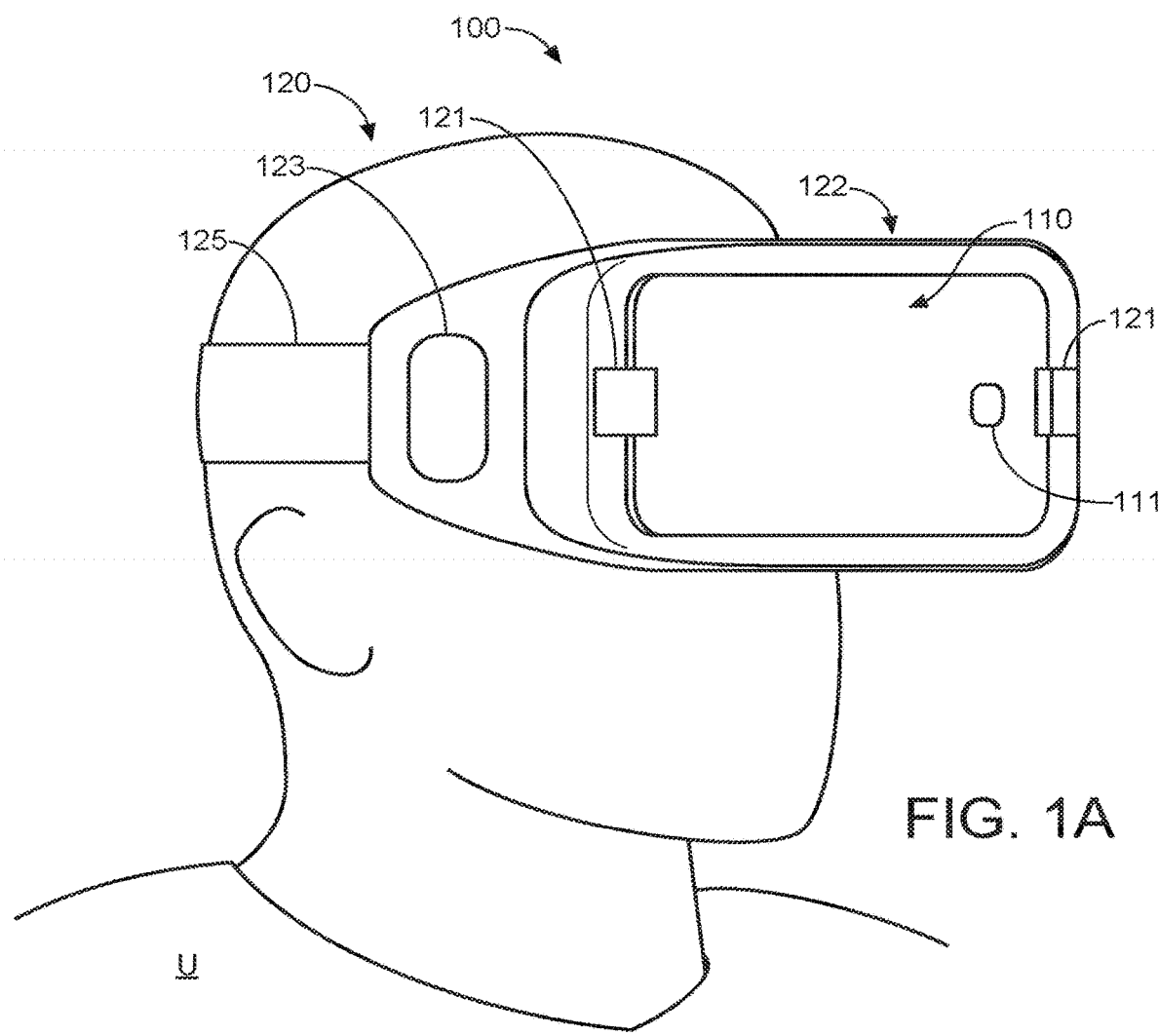
FIG. 1A shows a first embodiment user-controllable contrast sensitivity compensation system on a user.
Figure 1B:
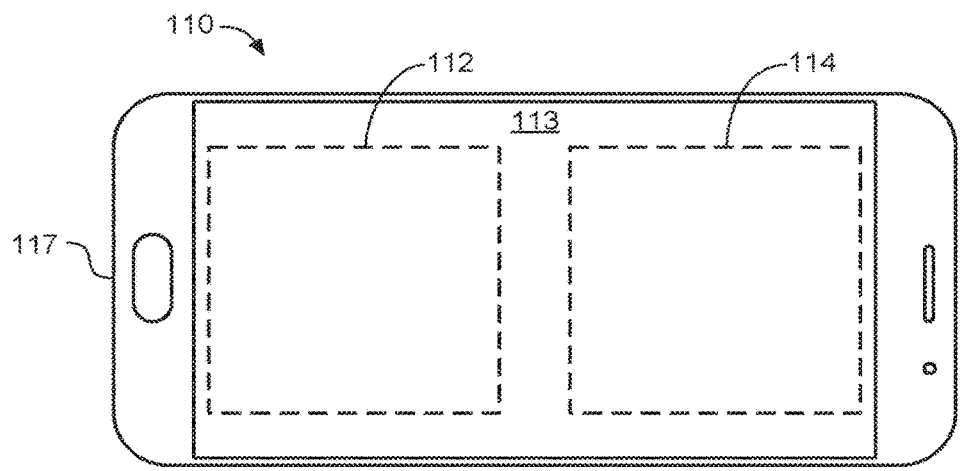
FIG. 1B shows a smartphone used in the system of FIG. 1A.
Figure 1C:
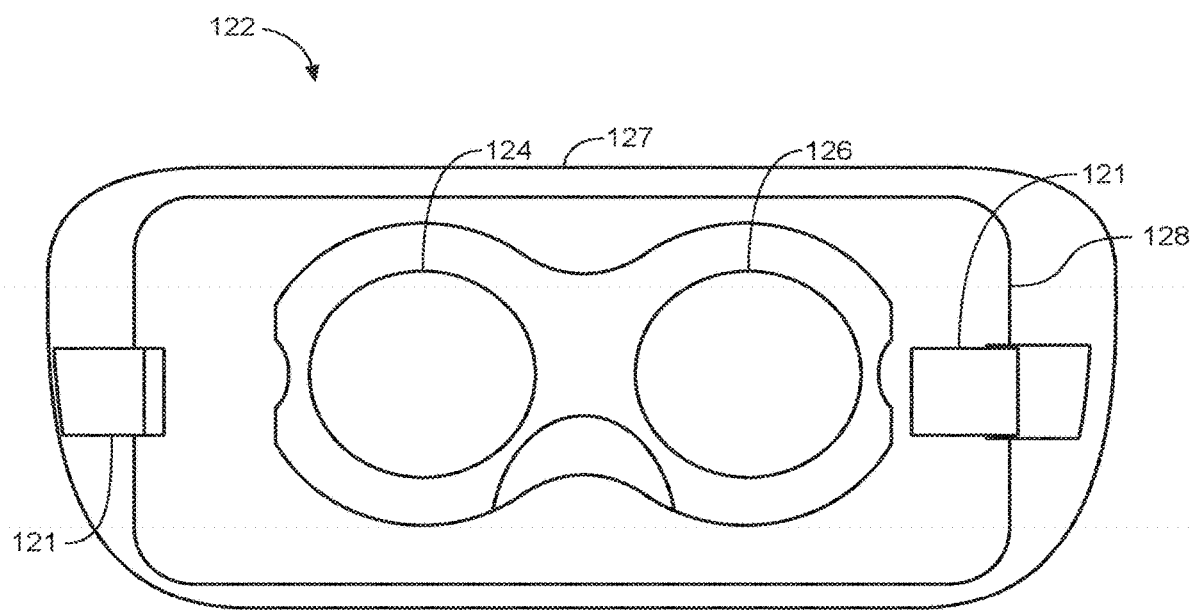
FIG. 1C shows the body of the goggle used in the system of FIG. 1A.

By way of a specific embodiment, FIGS. 1A, 1B, and 1C show a first embodiment contrast sensitivity compensation system 100, where FIG. 1A shows the system on a user U; FIG. 1B shows a smartphone used in the system; and FIG. 1C shows the body of the goggle used in the system. System 100 includes a smartphone 110 and pair of goggles 120. Smartphone 110 includes the electronics necessary for the contrast sensitivity compensation system 100, including a processor and memory (not shown), a forward-facing camera 111, as shown in FIG. 1A, and a screen 113 on the side opposite the camera, as shown in FIG. 1B. Smartphone 110 also includes an electrical connector 117. As described subsequently, processed camera images are displayed on one portion of screen 113 shown as a left area 112 and a second portion of the screen is shown as right area 114.

Goggles 120 include a body 122 and a strap 125 for holding the goggles on the user's head and a connector 128 that mates with smartphone connector 117. Body 122 includes, as shown in FIG. 1A, a pair of clamps 121 for removably restraining smartphone 110 and making the electrical connection between connectors 117 and 128, and input device 123 for providing input to the smartphone through the connectors and, as shown in FIG. 1C, a left lens 124 and right lens 126 and a focusing wheel 127. When assembled as in FIG. 1A, with smartphone 110 held in place by clamps 121, system 100 presents what is displayed in area 112 of screen 113, through lens 124, to the user's right eye, and what is displayed in area 114 of the screen, through lens 126, to the user's left eye. The user may use focusing wheel 127 to adjust the focus. In certain embodiments, goggles 120 are adapted to accept user input from input device 123, which may control or otherwise provide inputs to the accepted smartphone 110.

In certain embodiments, smartphone 110 is provided with programming, as through a contrast sensitivity compensation application (referred to herein as a "CSC App") which can: 1) operate camera 111 in a video mode to capture a stream of "input images"; 2) perform image processing on each input image to generate a stream of "output images"; and 3) present the stream of output images to screen 113. In certain embodiments, the stream of output images is presented sequentially side-by-side as two identical images—one in area 112 and one in area 114. Further, it is preferred that contrast sensitivity compensation system 100 operate so that the time delay between when the input images are obtained and when the output images are provided to screen 113 be as short as possible so that a user may safely walk and interact with the environment with goggles 120 covering their eyes.

Contrast sensitivity compensation system 100 has adjustable features that allow it to match the physiology of the user for use in different settings. These features are generally set once for each user, possibly with the need for periodic adjustment. Thus, for example, given the spacing between screen 113 and the eyes of user U, focusing wheel 127 permits for an optimal setting of the distance from the display (113) to lens 124 and 126. In addition, lens 124 and/or 126 may include refractive error correction. Further, it is important that the viewed spacing between the images in areas 112 and 114 match the user's interpupillary distance (IPD) to facilitate comfortable binocular viewing and preventing diplopia. This may be accounted for, by example, by shifting the spacing of the output images in areas 112 and 114 to match the IPD. Certain embodiments, described subsequently, include eye tracking to determine a user's gaze direction. For these systems, it is sometimes necessary to calibrate the system to obtain a correlation between the eye tracking measurement and actual gaze direction.

In various embodiments, the user may adjust setting using: input device 123 which may be a touchpad and which is electrically connected to smartphone 110, which is further programmed to modify the CSC App according to such inputs; a Bluetooth game controller that communicates with the smartphone 110 via Bluetooth; voice control using the microphone of the phone; gesture control using available devices such as the NOD gesture control ring (see, for example, http://techcrunch.com/2014/04/29/nod-bluetooth-gesture-control-ring/); or by the user of an eye tracker to implement gaze-directed control.

In addition, there are other features of contrast sensitivity compensation system 100 that can either be set up once for a user or may be user-adjustable. These features may include, but are not limited to, adjustments to the magnitude, shape, size, or placement of magnified portions of the output image, and color enhancement functions such as contrast, blur, ambient light level or edge enhancement of the entire image or portions of the image. In other embodiments, the compass and/or accelerometers within smartphone 110 may be used for enhancing orientation, location, or positioning of output images.

In certain embodiments, sound and/or vibration may be provided on smartphone 110 to generate for proximity and hazard cues. In other embodiments, the microphone of smartphone 110 can be used to enter voice commands to modify the CSC App. In certain other embodiments, image stabilization features or programming of smartphone 110 are used to generate output images.

In one embodiment, by way of example only, goggles 120 are commercially available virtual-reality goggles, such as Samsung Gear VR (Samsung Electronics Co. Ltd., Ridgefield Park, N.J.), and smartphone 110 is a Galaxy S8 (Samsung Electronics Co. Ltd., Ridgefield Park, N.J.). The Samsung Gear VR includes a micro USB to provide an electrical connection to the Galaxy Note 4 and has, as input devices 123, a touchpad and buttons.

It will be understood by those in the field that contrast sensitivity compensation system 100 may, instead of including a combination of smartphone and goggles, be formed from a single device which includes one or more cameras, a processor, display device, and lenses that provide an image to each eye of the user. In an alternative embodiment, some of the components are head-mounted and the other components are in communication with the head-mounted components using wired or wireless communication. Thus, for example, the screen and, optionally, the camera may be head-mounted, while the processor communicates with the screen and camera using wired or wireless communication.

Further, it will be understood that other combinations of elements may form the contrast sensitivity compensation system 100. Thus, an electronic device which is not a smartphone, but which has a processor, memory, camera, and display may be mounted in goggles 120. Alternatively, some of the electronic features described as being included in smartphone 110 may be included in goggles 120, such as the display or communications capabilities. Further, the input control provided by input device 123 may be provided by a remote-control unit that is in communication with smartphone 110.

Figure 5:
FIG. 5 is illustrative image used to show the transformation of images.
Figure 6A:
FIG. 6A shows a simulation of the view of the image of FIG. 5 for the first user.
Figure 6B:
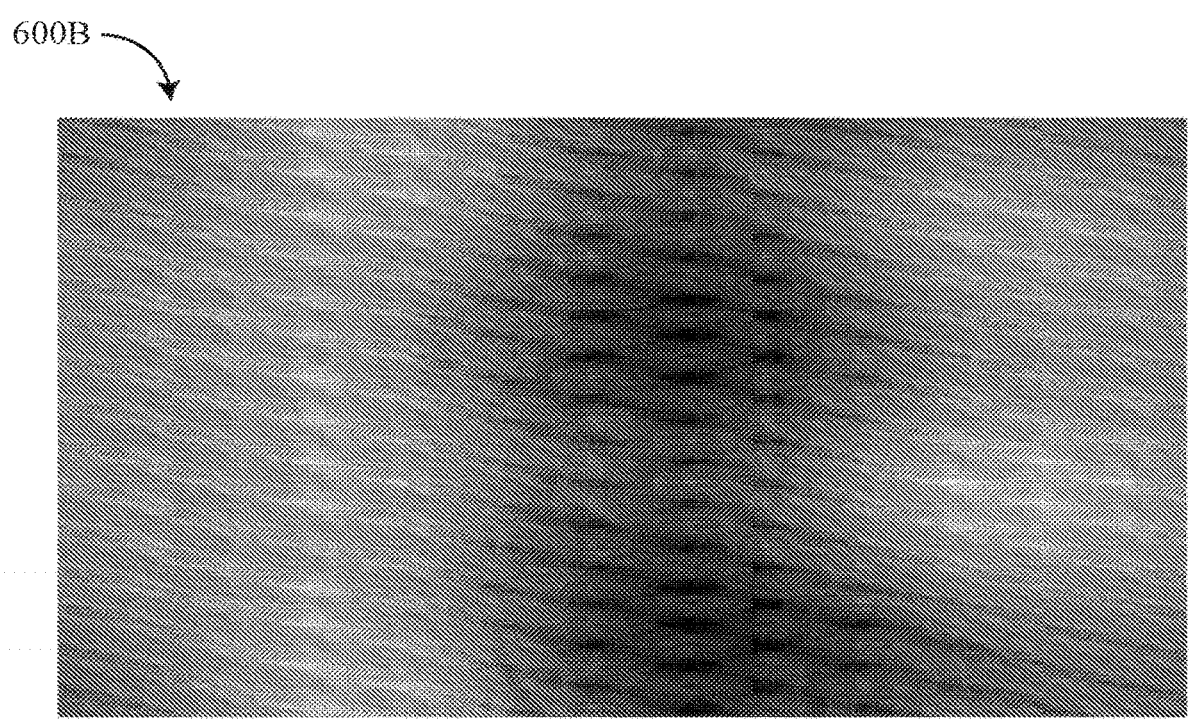
FIG. 6B shows a simulation of the view of the image of FIG. 5 for the second user.

One embodiment of the transformation of camera images into a displayed image is illustrated using an illustrative image 500 in FIG. 5. As discussed subsequently in greater detail, a user U has a deficiency in their ability to discern contrast for small objects. Image 600B of FIG. 6B is a simulation of how a user with impaired vision perceives image 500. As a user with normal vision will note by comparing images 500 and 600B, the user sees a blurred image, with loss of visibility more pronounced for smaller features in the image.

Figure 7:
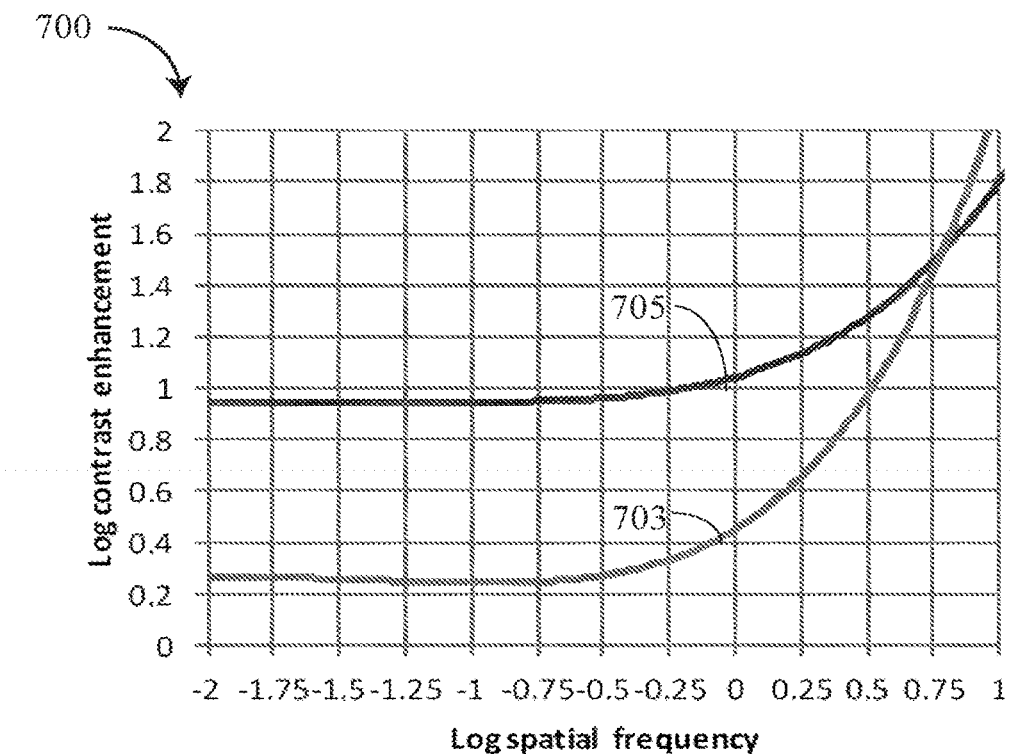
FIG. 7 as a graph of the contrast enhancement function versus spatial frequency for 2 users.

To correct for the loss of contrast, user U may wear contrast sensitivity compensation system 100 and run the CSC App with camera 111 directed at the scene of image 500. The CSC App operates camera 111 to obtain image 500, which is processed to generate an image 800B of FIG. 8B using contrast enhancement function 703 illustrated on a log scale in FIG. 7. CEF 703 is the inverse of the contrast attenuation function 403 illustrated on a log scale in FIG. 4. Specifically, CSC App processes images in a manner that is tailored to a specific user. This is done using a previously determined contrast enhancement function for the user. In certain embodiments, image 500 is processed by obtaining a Fast Fourier Transform (FFT) of image 500, modifying the FFT of the image by the contrast enhancement function 705 (illustrated on a log scale in FIG. 7 and represents the inverse of contrast attenuation function 405 in FIG. 4), and then performing an inverse FFT to form image 800B. Image 800B is then displayed on screen 113 for viewing by user U. In certain other embodiments, a CEF is obtained from a test of the user's vision. In certain other embodiments, the CEF is spatial frequency dependent, and thus, as shown in image 800A of FIG. 8A, the contrast enhancement of image 500 using CEF 703 in FIG. 7 is frequency dependent and may, for example, provide a lesser amount of contrast enhancement at certain spatial frequencies and a greater amount at other spatial frequencies (e.g., compared to CEF 703).

Figure 3:
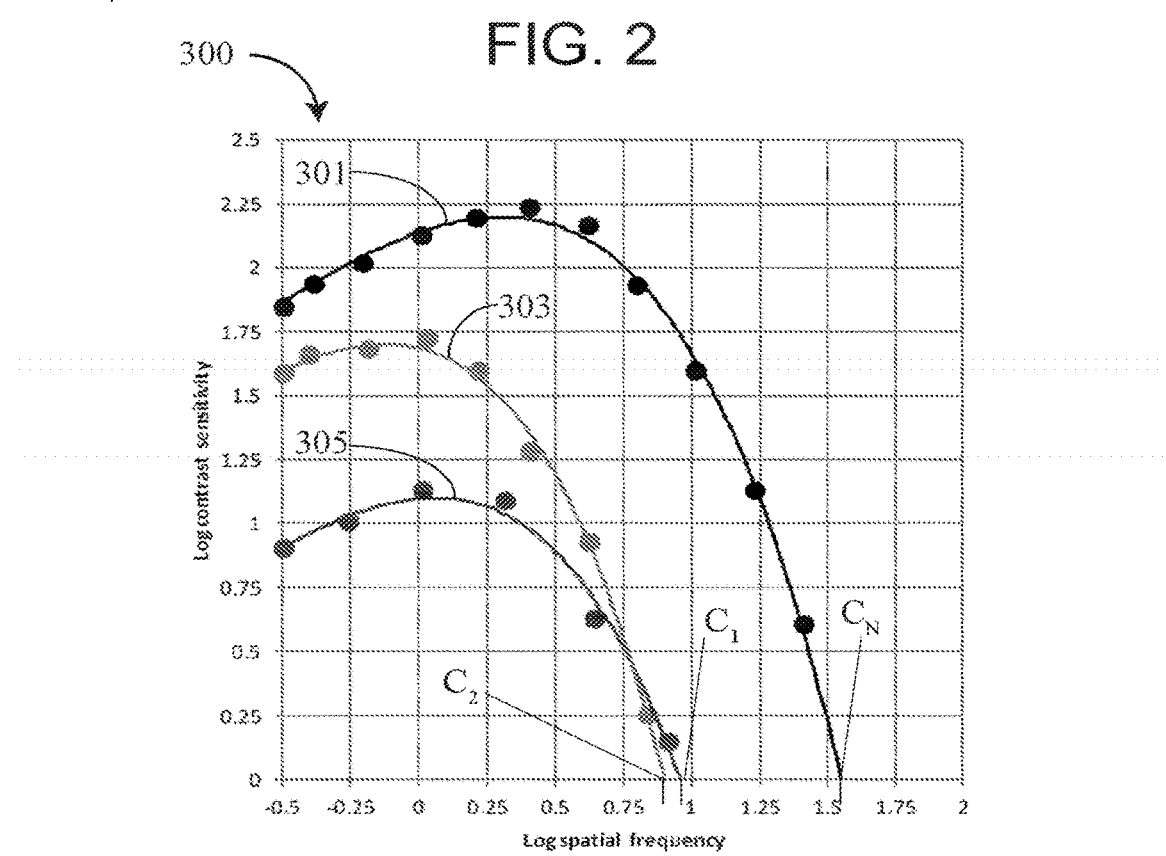
FIG. 3 is a graph of the logarithm of the CSF as a function of the logarithm of the spatial frequency for several users.
Figure 9A:
FIG. 9A is an image which is a simulation of how the first user perceives the contrast enhanced image of FIG. 8A.

Image 900B of FIG. 9A is a simulation of how the user with CSF 303 in FIG. 3 will perceive image 800B. A comparison of image 600B (which is how that user sees image 500) and image 900B (which is how the user sees the image processed image 500 of image 800B) shows how contrast sensitivity compensation system 100 improves the vision of user U. However, that is simply an attempted compensation of an unmagnified image that does not take into consideration: 1) that it is not possible to generate more than 100% contrast and 2) the user can see no contrast in any image at spatial frequencies above his or her cut-off frequency ($c_p$). Thus, the custom enhanced images still appear distorted to the respective user.

To prevent distortions, in addition to performing a spatial frequency dependent contrast adjustment customized to the user's CSF, it is necessary to increase the magnification, followed by a customized contrast adjustment within the envelop of the user's CSF to enhance the image for optimal vision.

Determination of the Contrast Enhancement Function

In certain embodiments, the CEF as a function of frequency u for a user p (written as $CEF_p(u)$) is obtained from a subjective measurement how a user's visual system discerns contrast as a function of spatial frequency and then mathematically manipulating the measurement to obtain the CEF. Determination of contrast sensitivity as a function of spatial frequency is known in the art (see, for example, Pelli and Bex, Measuring contrast sensitivity, Vision Res. 2013 Sep. 20; 90: 10-14. doi:10.1016/j.visres.2013.04.015.), and Chung S T et al, Comparing the Shape of Contrast Sensitivity Functions for Normal and Low Vision. Invest Ophthalmol Vis Sci. (2016).

A useful way of characterizing the sensitivity of the visual system is the contrast sensitivity CS as a function of spatial frequency which is written as $CSF_p(u)$. The $CSF_p(u)$ can be written as a mathematical function or a linear array, as is appropriate for its use. While not meant to limit the scope of the present invention, the CSF and other functions derived from or related to the CSF may be used to calculate a CEF, which may then be used to modify images.

Figure 2:
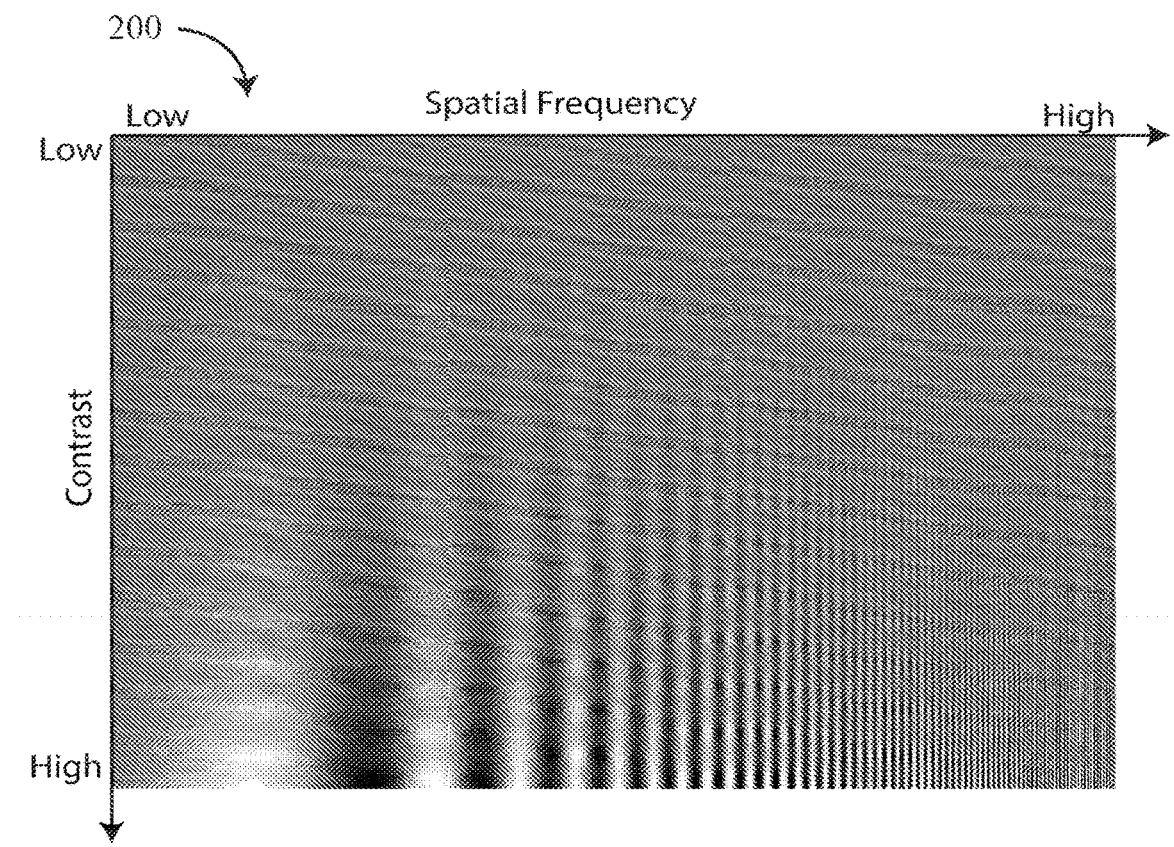
FIG. 2 is a two-dimensional chart of contrast versus spatial frequency.

The variation of contrast sensitivity with spatial frequency is demonstrated in FIG. 2 as a two-dimensional chart of spatial frequency versus contrast. One feature of chart 200 is light and dark bars having decreasing contrast as they are followed upwards. By visually following the light and dark bands at given spatial frequency upwards, it is seen that there is a minimum contrast for each spatial frequency that is discernable by the user. Generally, a user's contrast sensitivity is highest at mid-spatial frequency and falls off at low and high spatial frequencies. Thus, the light and dark bands seen as corresponding to low contrast at high and low spatial frequencies and to high contrast at mid frequencies.

The detectible contrast ranges from 0% for no contrast between dark and light, to 100% for a maximum contrast between dark and light. The CSF is the sensitivity and is the inverse of contrast detection with a corresponding range of from $-\infty$ to 1, and the log of CSF has a corresponding range of from $-\infty$ to 0.

In practice, the CSF may be determined by providing a user with an image or images having differing amounts of contrast and spatial frequency and by having them report on the limits of their contrast detection. Thus, the user is presented with several images each having a single spatial frequency (that is, with light and dark bands having the same spacing) and a contrast (that is, with a certain contrast between the light and dark bands). The user is prompted to indicate which image is at their limit of contrast detection. This is then repeated for several spatial frequencies. The result is a list of contrast detection thresholds for each spatial frequency, which is that user's CSF.

FIG. 3 includes a graph 300 of the logarithm of the CSF as a function of the log of the spatial frequency for several users. The data of graph 300 was obtained from Chung S T et al, Graph 300 includes a first curve 301, a second curve 303, and a third curve 305. First curve 301 is the CSF for a user with normal vision, or $CSF_n(u)$, which may be a curve obtained from one person with normal contrast sensitivity, or from the average of a plurality of people with normal contrast sensitivity, second curve 303 is the CSF for a first user with impaired contrast sensitivity, or $CSF_1(u)$, and third curve 305 is the CSF for a second user with impaired contrast sensitivity, or $CSF_2(u)$. The CSF for users p with impaired contrast sensitivity is referred to generally as $CSF_p$. In the discussion that follows, examples are provided for the users whose vision is characterized by CSF 303 and CSF 305. To simplify the discussion, the user whose vision is characterized by CSF 303 will be referred to as "a first user," and the user whose vision is characterized by CSF 305 will be referred to as "a second user."

In the examples of FIG. 3, the values of $CSF_1(u)$ and $CSF_2(u)$ are less than those of $CSF_n(u)$ at all spatial frequencies, with $CSF_1(u)$ representing a better degree of contrast sensitivity than $CSF_2(u)$. Each CSF has a value of zero at a cut-off frequency, c, which is the maximum discernable spatial frequency to that user. Specifically, $CSF_n(u)$ has a cut-off frequency for a user with normal vision of $c_n$, which is higher that a cut-off frequency of $c_1$ for the user with $CSF_1(u)$ or a cut-off frequency $c_2$ for the user with $CSF_2(u)$.

Figure 4:
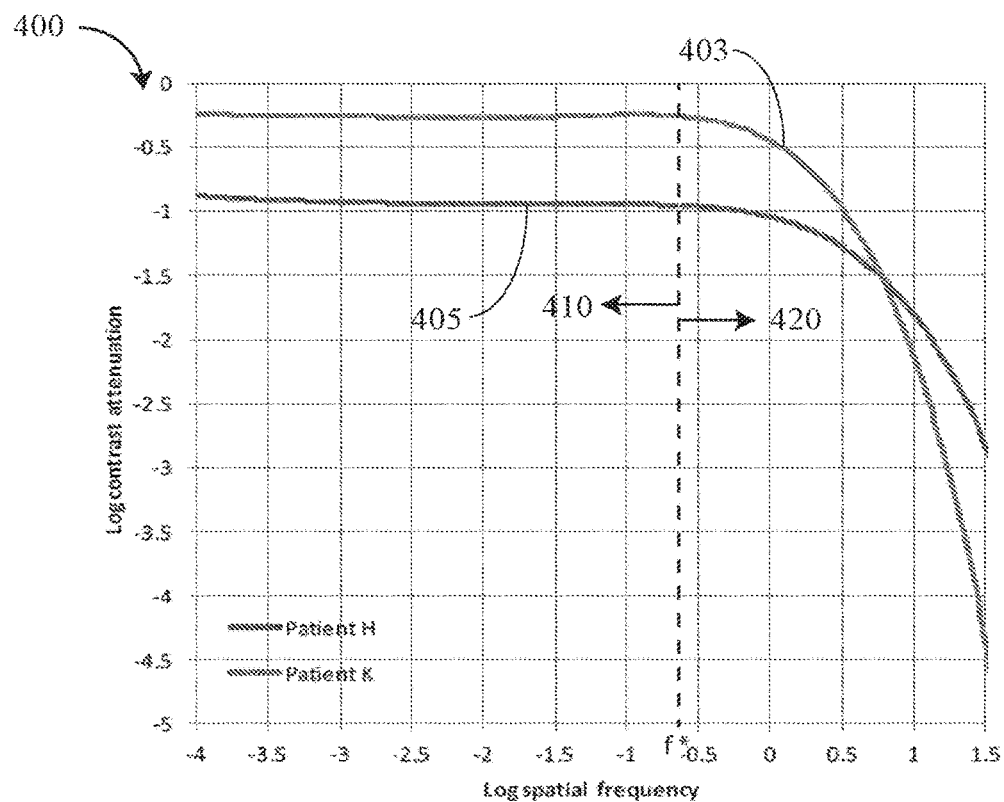
FIG. 4 as a graph of the contrast attenuation for 2 different users.

A useful measure for considering the loss of contrast detection relative to a user with a normal visual system is the contrast attenuation ($CA_p$) which is the ratio of the value of the $CSF_p$ of a user to the CSF of a user with normal vision, or $CA_p = CSF_p/CSF_n$. $CA_p$ provides an easy determination how a user with decreased contrast sensitivity views an image relative to how a user with normal contrast sensitivity views an image relative. FIG. 4 as a graph 400 on a log scale of $CA_p$ showing a curve 403, which is $CA_1$ (the ratio of $CSF_1(u)$ to $CSF_n(u)$), and a curve 405, which is $CA_2$, (the ratio of $CSF_2(u)$ to $CSF_n(u)$).

For the examples provided herein, at a spatial frequency less than f*, as indicted by the arrow 410, the contrast attenuation ratio is constant and less than 0—that is, the contrast loss is not size dependent. At a spatial frequency greater than f*, as indicted by the arrow 420, the contrast attenuation ratio decreases (relative contrast sensitivity loss increases) with frequency. It is thus seen that correcting for contrast loss requires a constant enhancement at low spatial frequencies and an increasing enhancement at higher spatial frequencies, as discussed subsequently.

Simulation of a User's Visual System Using the Contrast Enhancement Function

In considering the effect of processing images to be viewed by users having contrast loss, it is useful to have a simulation of how particular images appears to such a user. $CSF_p$ is a measure of how a user subjectively views an object and may be used to simulate how an image would appear to a user according to their $CSF_p$. In discussions of these simulations and the viewing of all transformed images, it is assumed that the reader has normal contrast detection.

Thus, for example, consider how an image appears to a user with a given $CSF_p$. Mathematically, an image may be described as a 2-D array A of intensity values. The array A may be viewed, for example, on a computer display and presented as an image A, and the terms "array" and "image" are generally used interchangeably herein.

The application of a $CSF_p$ to an image is performed by acting upon the $CSF_p$ with Fourier transform of A, $\mathcal{F}\{A\}$, by $CSF_p$, which may be written as follows:

$$V_p[A] = \mathcal{F}\{A\} \times CSF_p(u), \quad \text{Eq. 1a}$$

followed by the inverse Fourier transform $$B = \mathcal{F}^{-1}\{V_p[A]\}, \quad \text{Eq. 1b}$$

where B is an image obtained by modifying A by $CSF_p$. In other words, a user whose vision is characterized by a CSF will view the adjustment of image A as image B.

FIG. 5 is illustrative image 500 which is used to show the transformation of images. FIG. 6A shows a simulation of the view of the image of FIG. 5 for the first user as an image 600A. Specifically, image 600A is the result of transforming image 500 by $CSF_1$ using equations 1a and 1b. Specifically, image 500 is A in Eq. 1a, $CSF_1(u)$ is $CSF_p(u)$ in Eq. 1a, and image 600A is B of Eq. 1b. Image 600A is a simulation of how image 500 appears to the first user.

In another example, FIG. 6B shows a simulation of the view of the image of FIG. 5 for the second user as an image 600B. Specifically, image 600B is the result of transforming image 500 by CSF 305 using equations 1a and 1b. That is, image 500 is A in Eq. 1a, $CSF_2(u)$ is $CSF_p(u)$ in Eq. 1a, and image 600B is B of Eq. 1b. Image 600B is a simulation of how image 500 appears to the second user.

A comparison of $CSF_1(u)$ (curve 303) and image 600A to CSF 305 and image 600B reveals that the values of $CSF_2(u)$ are lower than the values of $CSF_1(u)$, and that image 600B, which corresponds to $CSF_2(u)$, has much less spatial resolution than image 600A, which corresponds to $CSF_1(u)$. Thus, the second user discerns far less detail that does the first user.

Contrast Compensation

In certain embodiments, a user's loss of contrast sensitivity may be compensated for by adjusting the contrast of an image using the contrast sensitivity data according the normal contrast sensitivity and the cut off frequency.

In one embodiment, the following contrast compensation method is used to enhance the contrast of image. Each image A(x, y) may be specified in terms of the image's luminance image Y(x,y), and chrominance images $C_B(x, y)$, $C_R(x, y)$, as A(x, y)=[Y(x, y), $C_B(x, y)$, $C_R(x, y)$]. First, a Fourier transform is performed on the luminance image Y(x, y) to obtain amplitude $M_Y(u)$ and phase $P_Y(u)$ spectra (vs spatial frequency, u). Next, the luminance amplitude is enhanced using the user's contrast enhancement function as follows: $M'_Y(u) = M_Y(u) \times CEF_p(u)$. Next, an inverse Fourier transform is performed on the enhanced luminance amplitude and the unaltered luminance phase function to obtain enhanced luminance image Y'(x,y). Lastly, the enhanced luminance image is combined with unaltered chrominance images to obtain enhanced full color image: C(x, y)=[Y'(x, y), $C_B(x, y)$, $C_R(x, y)$].

In certain embodiments, the compensation may be accomplished, for example, as follows. A contrast enhancement function for user $CEF_p$ as a function of spatial frequency u is defined as:

$$CEF_p(u) = \begin{cases} \dfrac{CSF_n\left(\dfrac{u \times c_n}{c_p}\right)}{CSF_p(u)} & \text{for } u \leq c_p \\ 1 & \text{for } u > c_p \end{cases} \quad \text{Eq. 2}$$

This $CEF_p$ provides for enhancement of the contrast at spatial frequencies that the user can discern to make an appropriately magnified image ($c_n/c_p$) appear to the patient the way the unmagnified image would appear to the normally sighted person.

FIG. 7 is a graph 700 of contrast enhancement function showing curve 703, which is $CEF_1(u)$, and curve 705, which is $CEF_2(u)$ if there is no correction for required magnification required by the reduction of the cut-off frequency (i.e., simply the inverse of the contrast attenuation function).

Figure 8A:
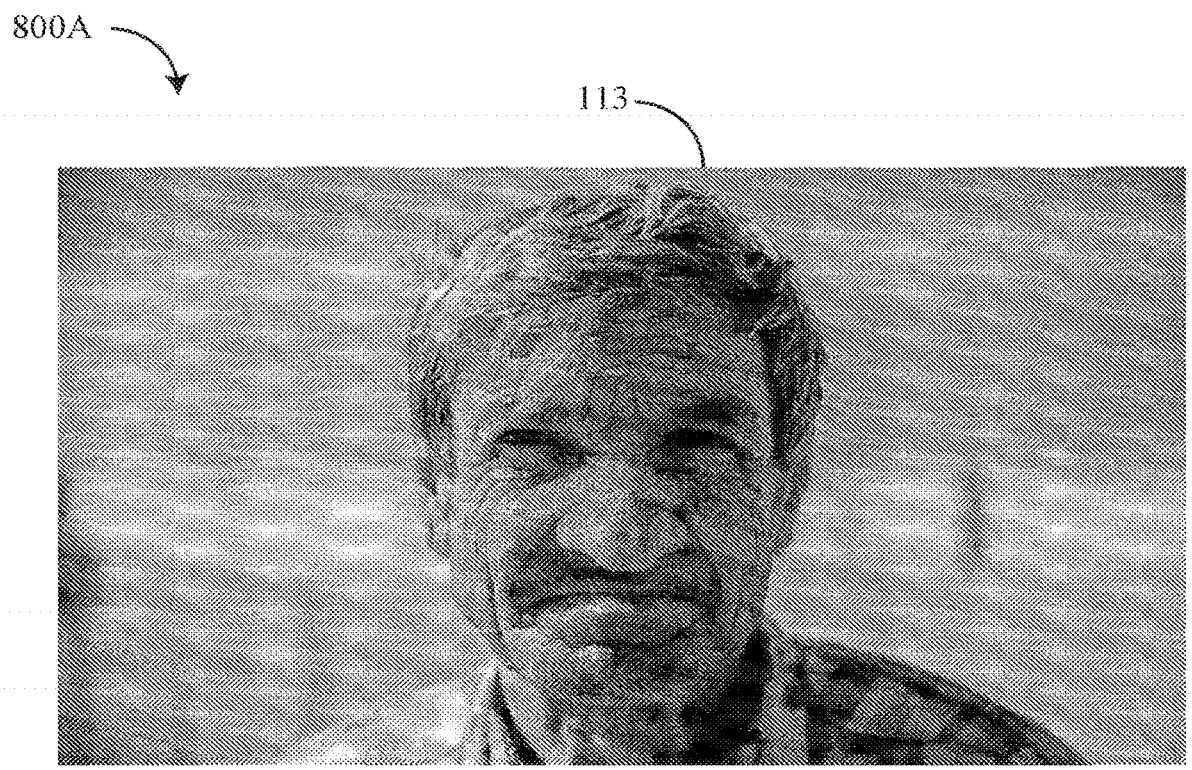
FIG. 8A shows an enhanced image which is the result of transforming the image of FIG. 5 by the contrast enhancement function for the first user.
Figure 8B:
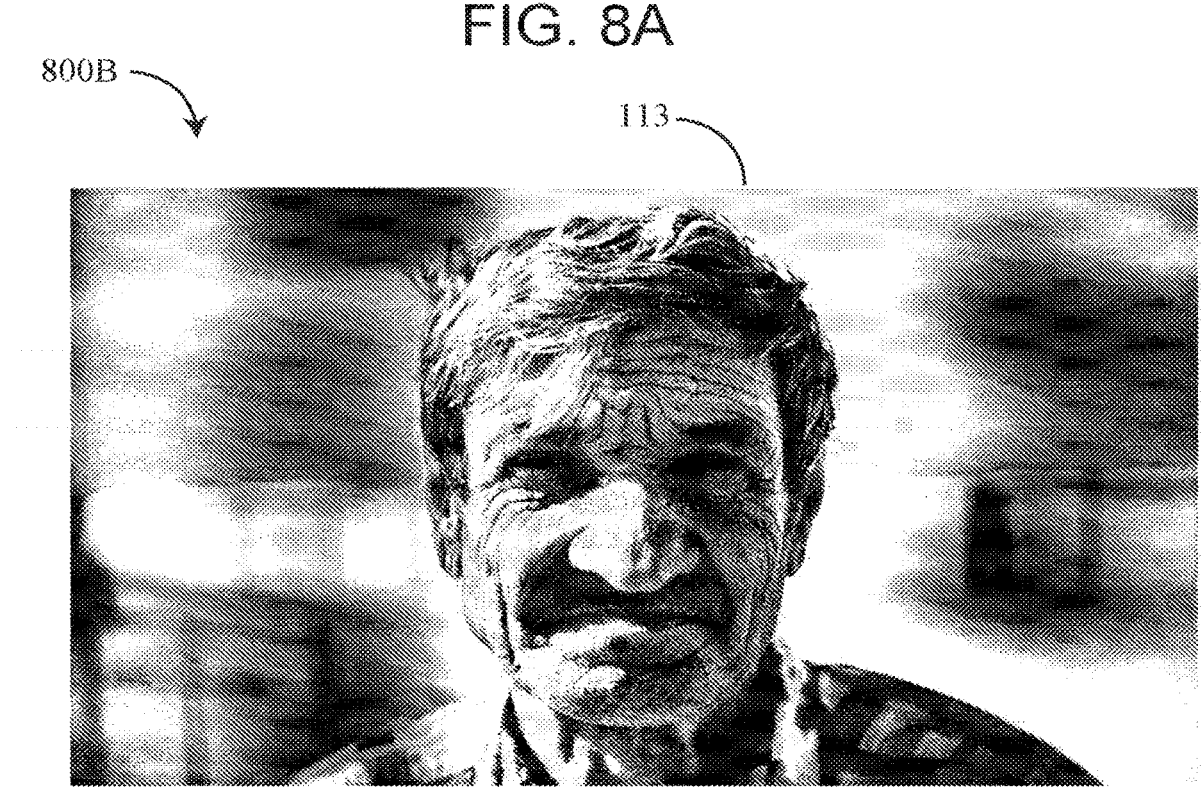
FIG. 8B shows an enhanced image which is the result of transforming the image of FIG. 5 by the contrast enhancement function for the second user.

FIG. 8A shows an enhanced image 800A, which is the result of transforming image 500 as described above by $CEF_1(u)$, as defined by graph 703 in FIG. 7. FIG. 8B shows an enhanced image 800B, which is the result of transforming image 500 by $CEF_2(u)$, as defined by graph 705 in FIG. 7.

In certain embodiments, image 500 is captured by camera 111 of contrast sensitivity compensation system 100 and the image, along with the user's CEF, is stored in the memory of smartphone 110 that is running the CSC App. The CSC App also includes programming to read image 500, apply the contrast enhancement described above, including Eq. 2a, and provide the transformed images C to screen 113, as noted in FIGS. 8A and 8B. In certain embodiments, the programming of the CSC App is performed using Fast Fourier Transforms or other techniques that are fast enough to allow for the viewing of images at the video rate of smartphone 110.

In certain other embodiments, the application of the CEF by the CSC App to an image may require additional computations or have other limitations. Thus, for example, it is not possible for an image to exceed 100% contrast, and thus the intensity in an image will be clipped at the maximum and minimum if the product of the Fourier transform and the contrast enhancement function exceeds 100% contrast. In addition, the mean luminance must remain fixed in order to not saturate the display with the inverse Fourier transform of the enhanced image. These ceiling and floor corrections are built into the compensation algorithm that generate the images shown above.

Figure 9B:
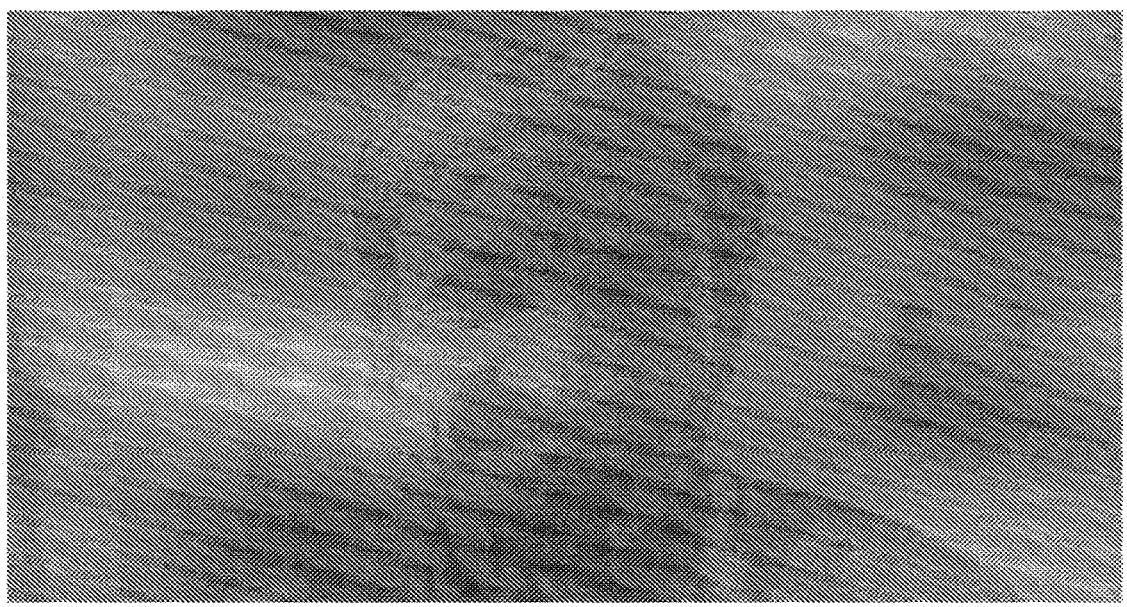
FIG. 9B is an image which is a simulation of how the second user perceives the contrast enhanced image of FIG. 8B.

The effectiveness of enhancing the image is illustrated by simulating how the enhanced images appear. This may be accomplished by taking the contrast enhance images (as shown, for example, in FIG. 8A) and using Eqs. 1a and 1b to simulate how the enhanced image appears to the user. FIG. 9A is an image 900A, which is a simulation of how a user with CSF 303 perceives contrast enhanced image 800A, and FIG. 9B is an image 900B, which is a simulation of how a user with CSF 305 perceives contrast enhanced image 800B. A comparison of the original image 500 with the simulation of how the contrast enhanced images 900A and 900B shows the ability to provide contrast enhancement to people suffering from the loss of contrast detection in their vision.

Magnification of an image must also be used, in conjunction with contrast enhancement, to compensate for a reduction in the cut-off frequency ($c_p < c_n$), which corresponds to a loss of visual acuity, as well as a loss of contrast sensitivity. Increased magnification shifts the spatial frequency spectrum of the scene down an "octave" or more, so that frequencies below the cutoff become visible, and can be enhanced, for the viewer.

Figure 10:
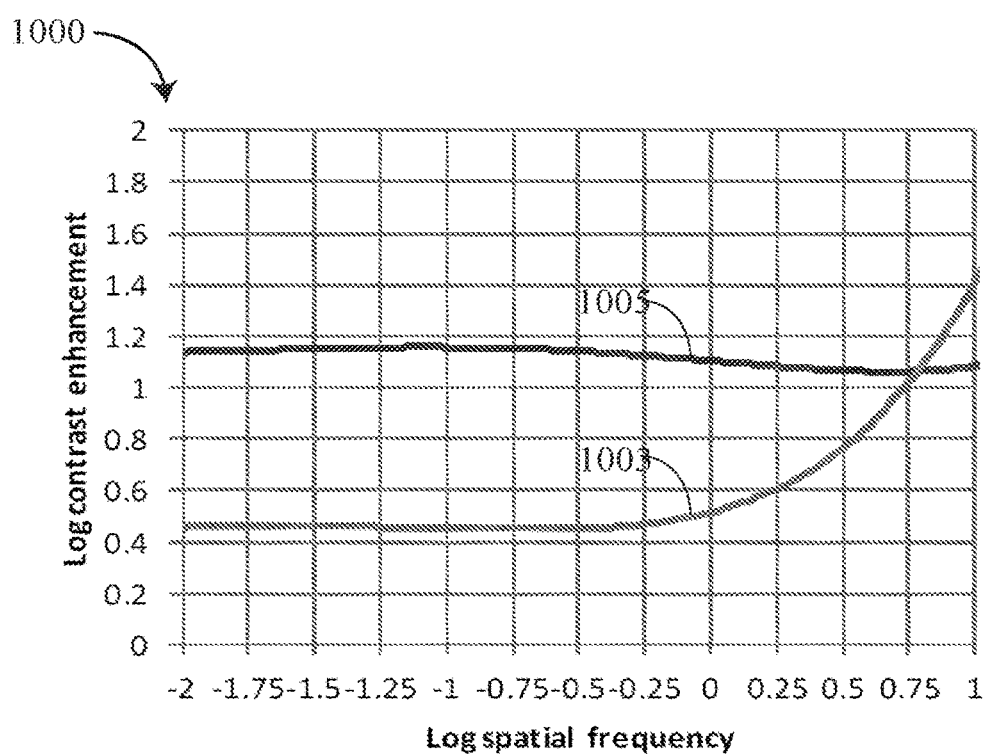
FIG. 10 shows a graph of the contrast enhancement function for 2 users for the image of FIG. 5 at a magnification of 2.
Figure 11:
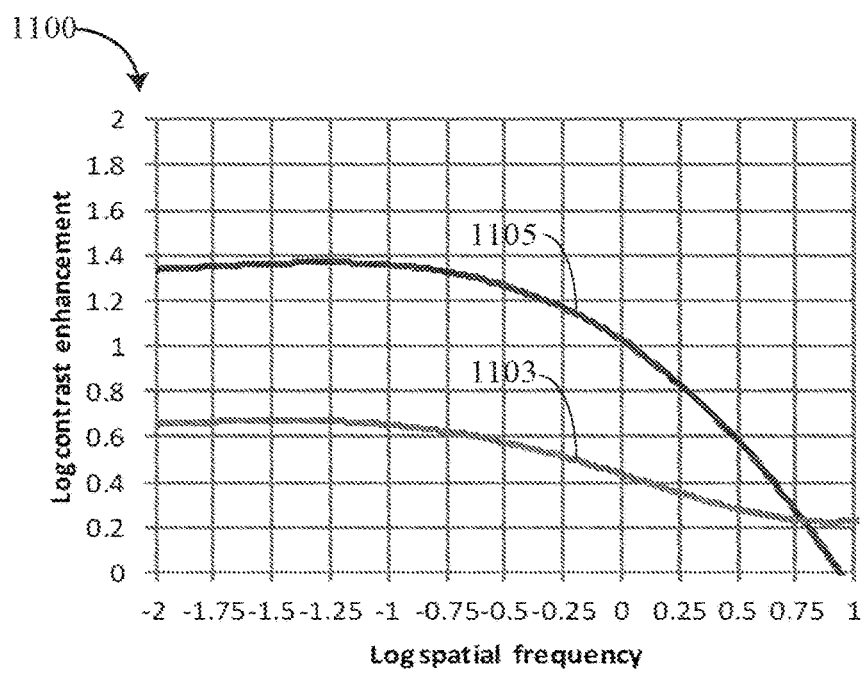
FIG. 11 shows a graph of the contrast enhancement function for 2 users for the image of FIG. 5 at a magnification of 4.
Figure 12:
FIG. 12 is an image of FIG. 5 at a magnification of 4.

As the magnification of the image is increased, the CEF changes accordingly to minimize distortion (for magnifications less than $c_n/c_p$, substitute the magnification for the cut-off frequency ratio in eq. 2). Thus, FIG. 7 shows graph 700 as the CEF for image 500, FIG. 10 as a graph 1000 of contrast enhancement function for image 500 at a magnification of 2×, showing curve 1003, which is $CEF_1(u)$, and curve 1005, which is $CEF_2(u)$. FIG. 11 is a graph 1000 of contrast enhancement function for image 1200 as shown in FIG. 12, which is image 500 at a magnification of 4×. Graph 1000 shows curve 1103, which is $CEF_1(u)$, and curve 1105, which is $CEF_2(u)$. The change in the CEF values is due to the change in spatial frequencies due to the magnification of the image.

Examples of images transformed by a CSF for an image with a magnification of 4 are presented herein using an illustrative image 1200. The transformed images are similar to the images described with reference image 500.

Figure 13A:
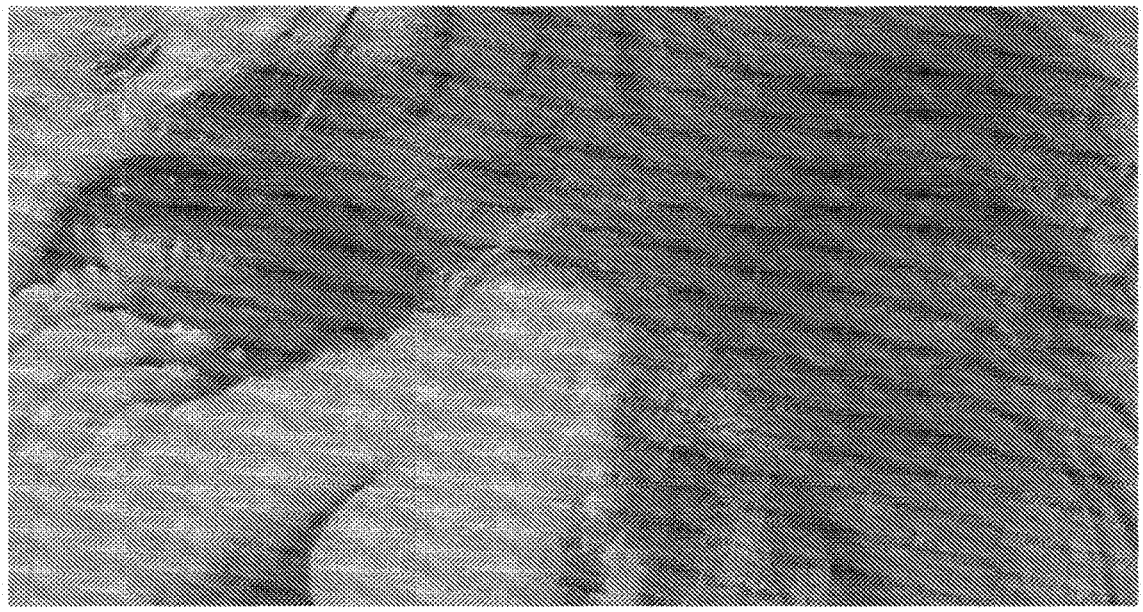
FIG. 13A shows a simulation of the view of the image of FIG. 12 for the first user.

FIG. 13A shows a simulation of the view in image 1300A of the image of FIG. 12 for the first user. Specifically, image 1300A is the result of transforming image 1200 by $CSF_1(u)$ using Eqs. 1a and 1b.

Figure 13B:
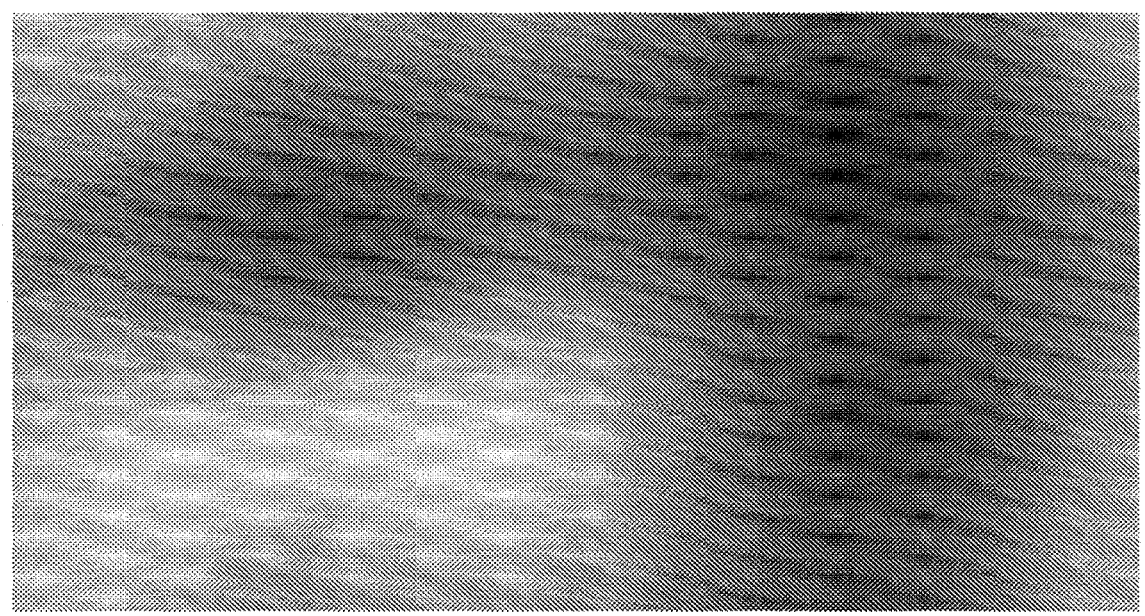
FIG. 13B shows a simulation of the view of the image of FIG. 12 for the second user.

FIG. 13B shows a simulation of the view in image 1300B of the image of FIG. 12 for the second user. Specifically, image 1300B is the result of transforming image 1200 by $CSF_2(u)$ using Eqs. 1a and 1b.

Figure 14A:
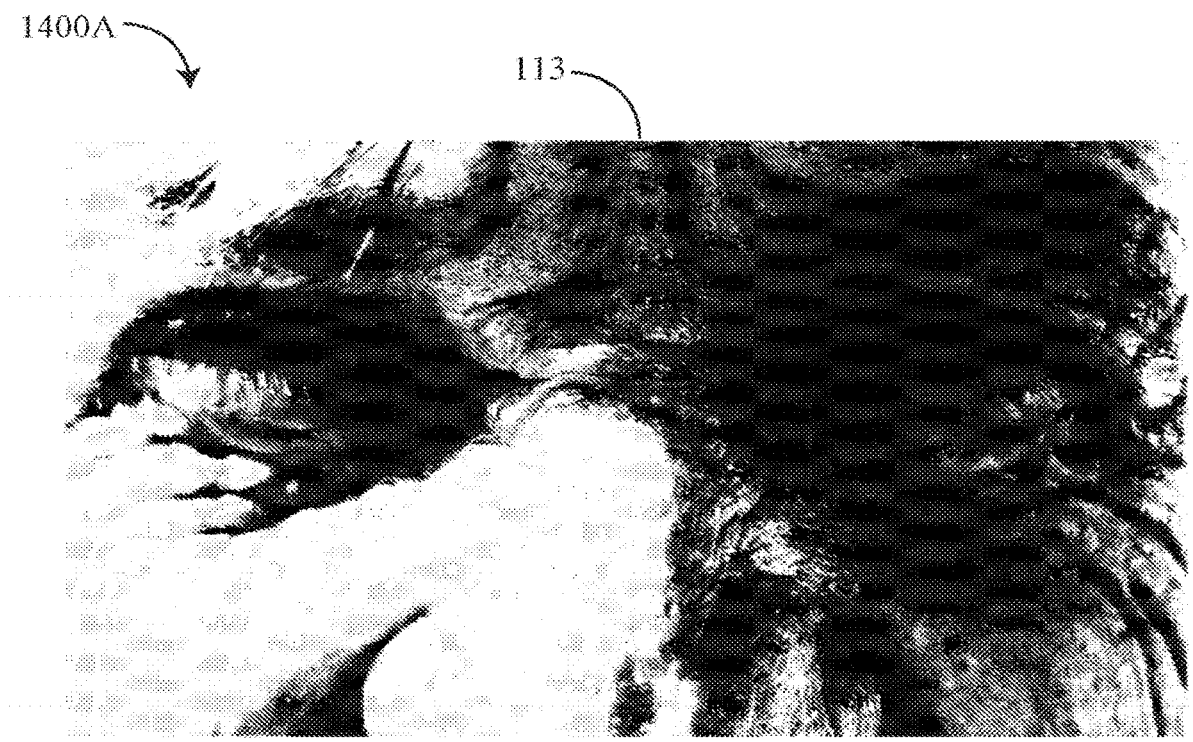
FIG. 14A shows an enhanced image resulting from transforming image of FIG. 12 for the first user.
Figure 14B:
FIG. 14B shows an enhanced image resulting from transforming the image of FIG. 12 for the second user.

Examples of images which may be provided to individuals according to their CSF to correct for their lack of contrast sensitivity of image 1200 are shown in FIG. 14A, which shows an enhanced image 1400A resulting from transforming image 1200 by curve 1103 as described above, including Eq. 2, and FIG. 14B shows an enhanced image 1400B resulting from transforming image 1200 by curve 1105 as described above, including Eq. 2.

Figure 15A:
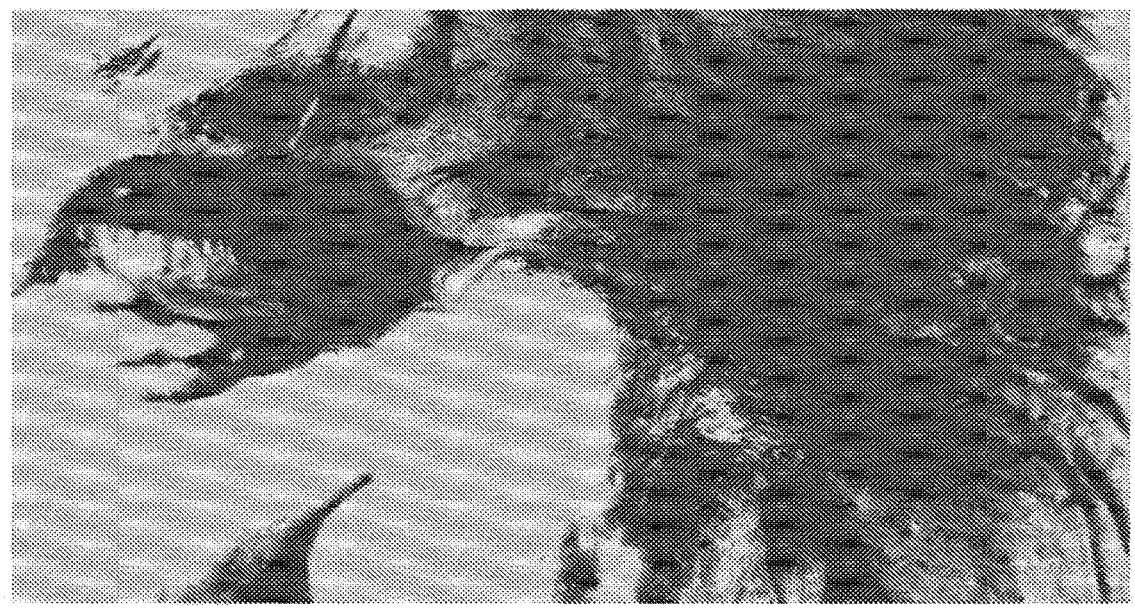
FIG. 15A shows a simulation of how the first user perceives the contrast enhanced image of FIG. 14A.

The effectiveness of enhancing the image is illustrated by simulating how the enhanced images appear. FIG. 15A is an image 1500A, which is a simulation of how the first user perceives contrast enhanced image 1400A, and FIG. 15B is an image 1500B, which is a simulation of how the second user perceives contrast enhanced image 1400B.

Figure 15B:
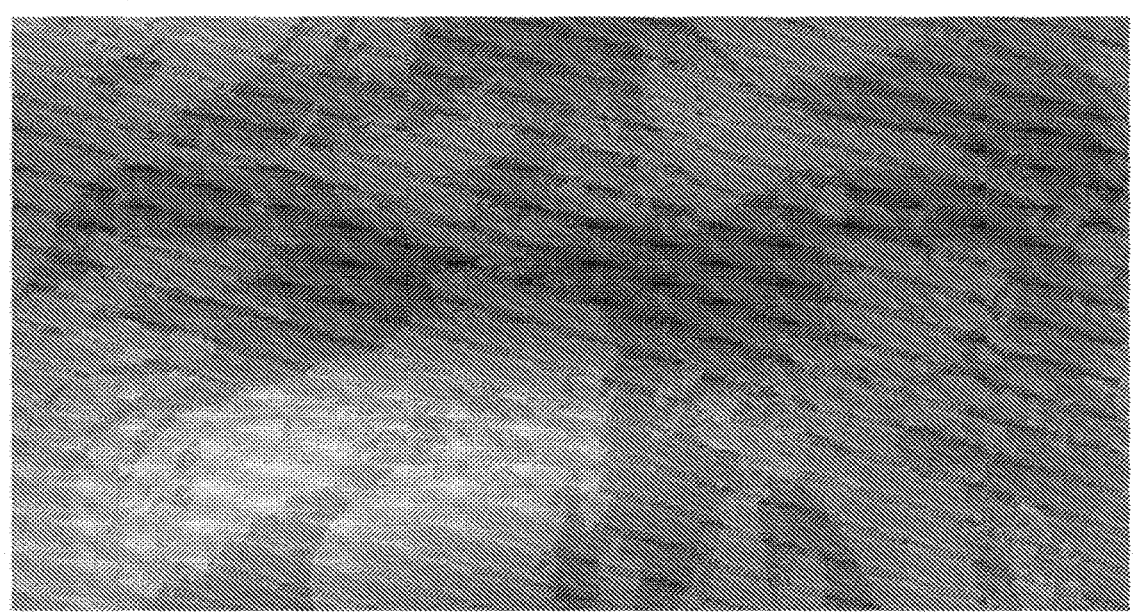
FIG. 15B shows a simulation of how the second user perceives the contrast enhanced image of FIG. 14B.

The effect of magnification and contrast enhancement is seen by comparing simulations of FIGS. 8A and 15A, which show the effect of magnification for the user having $CSF_1$, and FIGS. 8B and 15B, which show the effect of magnification for the user having $CSF_2$.

It is to be understood that the invention includes all of the different combinations embodied herein. Throughout this specification, the term "comprising" shall be synonymous with "including," "containing," or "characterized by," and is inclusive or open-ended and does not exclude additional, unrecited elements or method steps. "Comprising" is a term of art which means that the named elements are essential, but other elements may be added and still form a construct within the scope of the statement. "Comprising" leaves an opening for the inclusion of unspecified ingredients even in major amounts.

It will be understood that the steps of methods discussed are performed in one embodiment by an appropriate processor (or processors) of a processing (i.e., computer) system, electronic device, or smartphone, executing stored instructions (code segments). It will also be understood that the invention is not limited to any particular implementation or programming technique and that the invention may be implemented using any appropriate techniques for implementing the functionality described herein. The invention is not limited to any particular programming language or operating system.

Further, it is one aspect of the contrast compensation method described herein to enhance images within or near the discernable spatial frequency range of the user's vision. Thus, while examples are provided using the contrast compensation method discussed above, it will be obvious to one skilled in the art that other algorithms or combinations of algorithms may be substituted which approximate this method in that images are enhanced within certain ranges of spatial frequencies. Thus, for example, other contrast enhancement functions, image transformations, and/or methods of characterizing the user's vision, or approximating a characterization of the user's vision fall within the scope of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner as would be apparent to one of ordinary skill in the art from this disclosure in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A non-transitory computer program product adapted to be executed by a programmable electronic device configured to be worn on a head of a user and adapted to obtain and enhance video images captured by the programmable electronic device, the product comprising:

programmatic instructions that, when executed by the programmable electronic device, obtain the video images, wherein the video images comprise a plurality of input images;

programmatic instructions that, when executed by the programmable electronic device, apply a contrast enhancement function to the plurality of input images to form a plurality of contrast enhanced images comprising contrast enhanced video images, wherein the contrast enhancement function is customized to the user's vision and wherein the contrast enhancement function is frequency-dependent, and programmatic instructions that, when executed by the programmable electronic device, present, on a display of the programmable electronic device, the contrast enhanced video images, such that the contrast enhanced video images are preferentially enhanced at a maximum spatial frequency at which the user can discern contrast.

2. The non-transitory computer program product of claim 1, where the contrast enhancement function depends, at least in part, on a contrast sensitivity function that corresponds to minimum discernable contrasts to the user as a function of spatial frequency.

3. The non-transitory computer program product of claim 2, where the contrast enhancement function depends on the maximum spatial frequency.

4. The non-transitory computer program product of claim 1, wherein each image of the plurality of input images includes a luminance image and chrominance images and wherein applying the contrast enhancement function to the plurality of input images comprises performing a Fourier transform on the luminance image to obtain a luminance amplitude.

5. The non-transitory computer program product of claim 4, wherein applying the contrast enhancement function to the plurality of input images further comprises performing the Fourier transform on the luminance image to obtain a luminance phase.

6. The non-transitory computer program product of claim 5, wherein applying the contrast enhancement function to the plurality of input images further comprises enhancing the luminance amplitude.

7. The non-transitory computer program product of claim 6, wherein applying the contrast enhancement function to the plurality of input images further comprises performing an inverse Fourier transform on the enhanced luminance amplitude and the luminance phase to obtain an enhanced luminance image.

8. The non-transitory computer program product of claim 7, wherein applying the contrast enhancement function to the plurality of input images further comprises combining the enhanced luminance image with the chrominance images to form the contrast enhanced video images.

9. The non-transitory computer program product of claim 1, wherein the programmable electronic device is a smartphone.

10. The non-transitory computer program product of claim 1, wherein the programmable electronic device is integrated into a set of goggles configured to be worn by the user.

11. A non-transitory computer program product adapted to be executed by a programmable electronic device configured to be worn on a head of a user and adapted to obtain and enhance video images captured by the programmable electronic device, the product comprising:

programmatic instructions that, when executed by the programmable electronic device, obtain the video images, wherein the video images comprise a plurality of input images;

programmatic instructions that, when executed by the programmable electronic device, apply a contrast enhancement function to the plurality of input images to form a plurality of contrast enhanced images comprising contrast enhanced video images, wherein the contrast enhancement function is customized to the user's vision, wherein the contrast enhancement function is frequency-dependent, and wherein the contrast enhancement function is adapted to enhance a luminance image of the plurality of input images without altering chrominance images of the plurality of input images, and programmatic instructions that, when executed by the programmable electronic device, present, on a display of the programmable electronic device, the contrast enhanced video images.

12. The non-transitory computer program product of claim 11, further comprising programmatic instructions that, when executed by the programmable electronic device, present on said display the contrast enhanced video images such that the contrast enhanced video images are preferentially enhanced at a maximum spatial frequency at which the user can discern contrast.

13. The non-transitory computer program product of claim 11, where the contrast enhancement function depends, at least in part, on a contrast sensitivity function that corresponds to minimum discernable contrasts to the user as a function of spatial frequency.

14. The non-transitory computer program product of claim 11, where the contrast enhancement function depends on a maximum spatial frequency at which the user can discern contrast.

15. The non-transitory computer program product of claim 11, wherein each image of the plurality of input images includes the luminance image and the chrominance images and wherein applying the contrast enhancement function to the plurality of input images comprises performing a Fourier transform on the luminance image to obtain a luminance amplitude.

16. The non-transitory computer program product of claim 15, wherein applying the contrast enhancement function to the plurality of input images further comprises performing the Fourier transform on the luminance image to obtain a luminance phase.

17. The non-transitory computer program product of claim 16, wherein applying the contrast enhancement function to the plurality of input images further comprises enhancing the luminance amplitude.

18. The non-transitory computer program product of claim 17, wherein applying the contrast enhancement function to the plurality of input images further comprises performing an inverse Fourier transform on the enhanced luminance amplitude and the luminance phase to enhance the luminance image.

19. The non-transitory computer program product of claim 18, wherein applying the contrast enhancement function to the plurality of input images further comprises combining the enhanced luminance image with the chrominance images to form the contrast enhanced video images.

20. The non-transitory computer program product of claim 11, wherein the programmable electronic device is a smartphone.

21. The non-transitory computer program product of claim 11, wherein the programmable electronic device is integrated into a set of goggles configured to be worn by the user.

* * * * *